United States Patent
May

(10) Patent No.: US 7,208,919 B2
(45) Date of Patent: Apr. 24, 2007

(54) METHOD AND APPARATUS FOR DIGITALLY REGULATING AN OUTPUT VOLTAGE USING NOISE-SHAPED COMPONENT SELECTION

(75) Inventor: Marcus W. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 154 days.

(21) Appl. No.: 11/130,539

(22) Filed: May 17, 2005

(65) Prior Publication Data
US 2006/0261789 A1 Nov. 23, 2006

(51) Int. Cl.
G05F 1/70 (2006.01)
G05F 1/12 (2006.01)

(52) U.S. Cl. .................. 323/211; 323/274; 323/293; 323/352; 323/369; 323/370

(58) Field of Classification Search .......... 323/208, 323/210, 211, 273, 274, 280, 293, 352, 353, 323/354, 364, 369, 370
See application file for complete search history.

(56) References Cited

U.S. PATENT DOCUMENTS

| | | | | |
|---|---|---|---|---|
| 4,791,349 A | * | 12/1988 | Minks | .......... 323/273 |
| 5,559,424 A | * | 9/1996 | Wrathall et al. | .......... 323/280 |
| 5,777,463 A | * | 7/1998 | Renous | .......... 323/293 |

* cited by examiner

Primary Examiner—Jessica Han
(74) Attorney, Agent, or Firm—Garlick Harrison & Markison; Kevin L. Smith

(57) ABSTRACT

Provided is a digitally-controlled linear regulator having noise-shaped component selection. The digitally-controlled linear regulator has a regulated-voltage sensor, a comparator module, a quantization module, and an impedance switching network. The regulated-voltage sensor is operably coupled to sense an output voltage of the digitally-controlled linear regulator to produce a sensed output voltage. The comparator module is operably coupled to compare the sensed output voltage with a reference voltage at a predetermined clock rate to produce a digital regulation signal. The quantization module is operably coupled to quantize the digital regulation signal to produce a quantized regulation signal. The impedance switching network is operably coupled to convert a source voltage into the output voltage of the digitally-controlled linear regulator based on the quantized regulation signal.

18 Claims, 6 Drawing Sheets digitally-controlled linear regulator 200

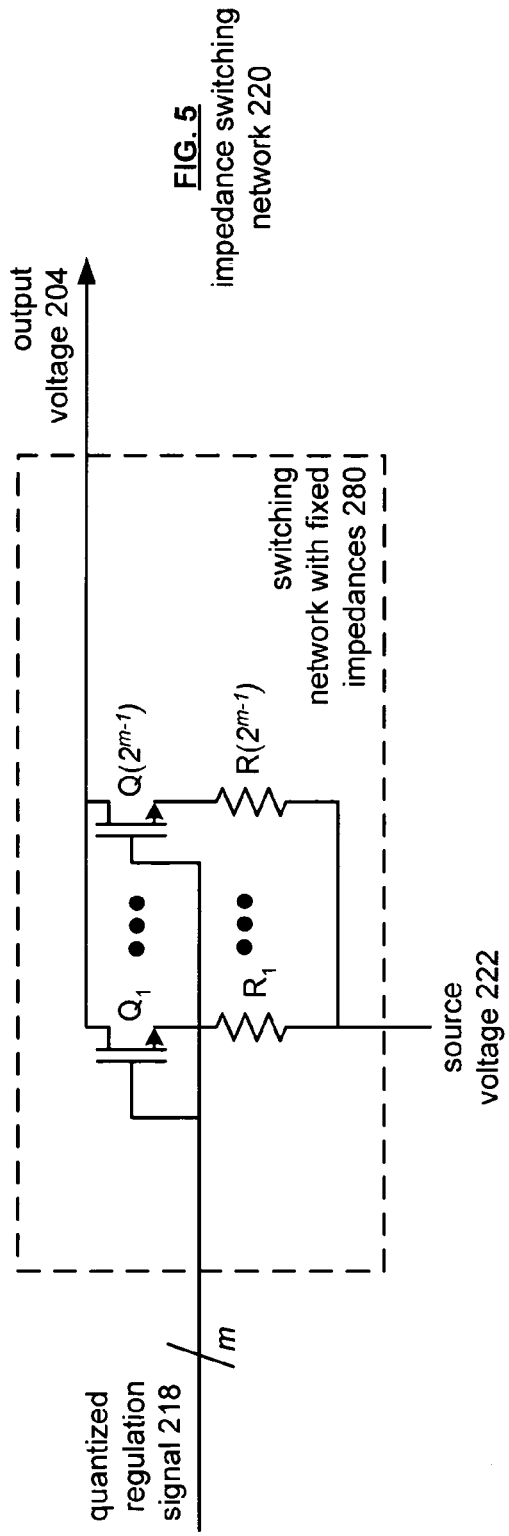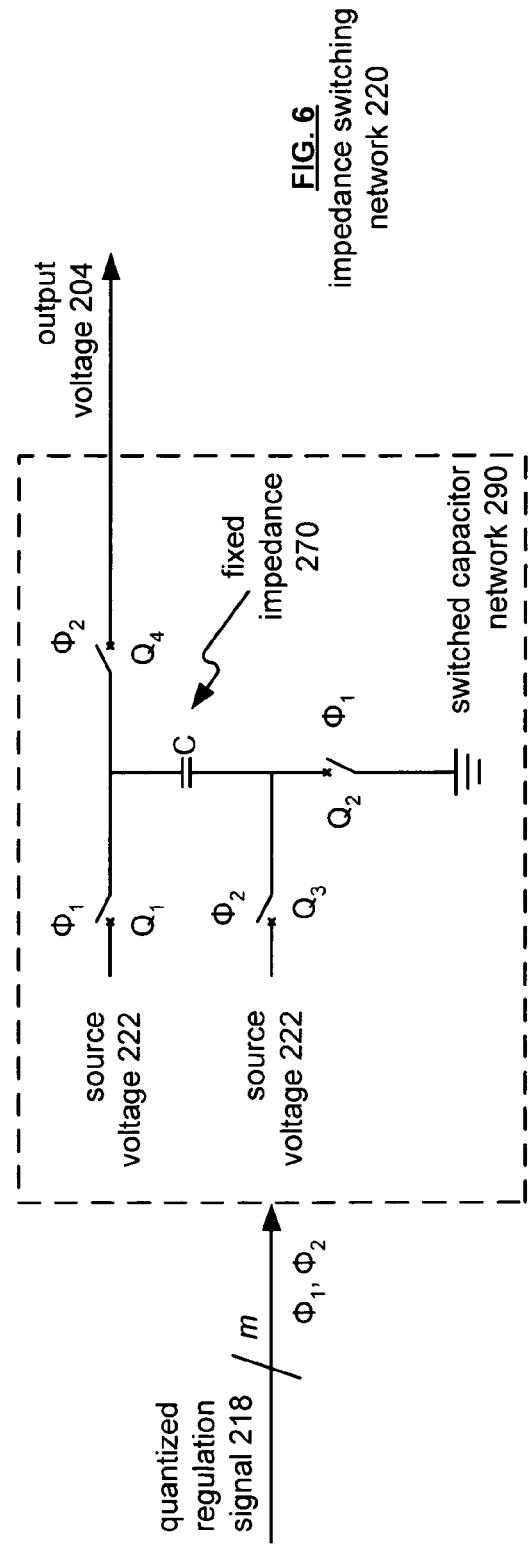

impedance switching network 220

METHOD AND APPARATUS FOR DIGITALLY REGULATING AN OUTPUT VOLTAGE USING NOISE-SHAPED COMPONENT SELECTION

TECHNICAL FIELD

This invention relates generally to power supplies and more particularly to digitally regulating DC output voltages.

BACKGROUND

As is known, all electronic devices that include integrated circuits require at least one DC voltage supply and typically require multiple DC voltage supplies. A DC voltage supply may be generated from an AC voltage source (for example, 110 volts AC) or from another DC voltage supply (for example, a battery). To generate a DC voltage supply from an AC voltage, the AC voltage is processed in a controlled manner. For example, a switch-mode power supply will rectify the AC voltage to produce a DC bridge voltage. Using one of a plurality of switch mode converter topologies (for example, full bridge, half bridge, buck, or boost) an inductor is charged and discharged at a controlled rate to produce a regulated DC voltage supply.

Generally, analog-based circuitry is used to regulate the DC voltage supply at the desired voltage using feedback loops. Typically in such circuitry, a resistance divider network is coupled to the DC voltage supply to produce a representation of the DC output that is provided to a controlled circuit. The control circuit includes an operational amplifier, a saw tooth generator, and a comparator. The operational amplifier receives the representation of the DC output and a reference voltage to produce, therefrom, an error signal. The comparator receives the error signal and a saw tooth signal, which is produced from the saw tooth generator, and produces, therefrom, a pulse width modulation signal. The pulse width modulation signal controls the charging and discharging of the inductor. Depending on the overall gain of the power supply, the DC output can be regulated within a few milli-volts.

For mixed-signal integrated circuit devices having analog and digital circuitry, however, analog-based regulation circuitry has basic power requirements that can impact power conservation objectives for the device. These power conservation objectives translate to extending the battery lifespan of the devices. An example is to turn off circuitry or slow down the clock rate to that circuitry when it is not needed to support the present function. Another example is to put the device in a "sleep" mode when the entire device is not "in use."

But the analog-based regulator has minimum power requirements to sustain operational characteristics such as the available headroom voltage, sustaining stability of the regulator components. Reducing the power below these minimum power requirements adversely affect the performance of the analog-based regulator and the integrated circuit device generally. Thus, these minimum power requirements of analog-based regulators can frustrate maximizing the battery lifespan of such devices.

Therefore, a need exists for a method and apparatus of regulating DC output supplies without the above-referenced limitations.

SUMMARY

Accordingly, provided is a digitally-controlled linear regulator having noise-shaped component selection. The digitally-controlled linear regulator has a regulated-voltage sensor, a comparator module, a quantization module, and an impedance switching network. The regulated-voltage sensor is operably coupled to sense an output voltage of the digitally-controlled linear regulator to produce a sensed output voltage. The comparator module is operably coupled to compare the sensed output voltage with a reference voltage at a predetermined clock rate to produce a digital regulation signal. The quantization module is operably coupled to quantize the digital regulation signal to produce a quantized regulation signal. The impedance switching network is operably coupled to convert a source voltage into the output voltage of the digitally-controlled linear regulator based on the quantized regulation signal.

DESCRIPTION OF THE DRAWINGS

FIG. 5 illustrates a schematic block diagram of the impedance switching network of FIG. 2 implementing a switching network with fixed impedance circuit;

FIG. 6 illustrates a schematic block diagram of the impedance switching network of FIG. 2 implementing a switched-capacitor network;

DETAILED DESCRIPTION

The embodiments of the present invention may be practiced in a variety of settings that implement a power converter, such as a digitally-controlled linear regulator.

For example, in one embodiment of the invention, a digitally-controlled linear regulator having noise-shaped component selection receives power and regulates the voltage to an output voltage, which is utilized by other component(s) powered by the linear regulator. When external power (such as power provided by a Universal Serial Bus interconnection), the digitally-controlled linear regulator may regulate this voltage as well. With that understanding, the examples below are described in reference to regulating a battery voltage to a DC voltage, which powers a load. Furthermore, although a variety of different systems and components may be implemented, a particular system implementation is illustrated in FIG. 1 as one embodiment of a system to practice the invention.

Figure 1:
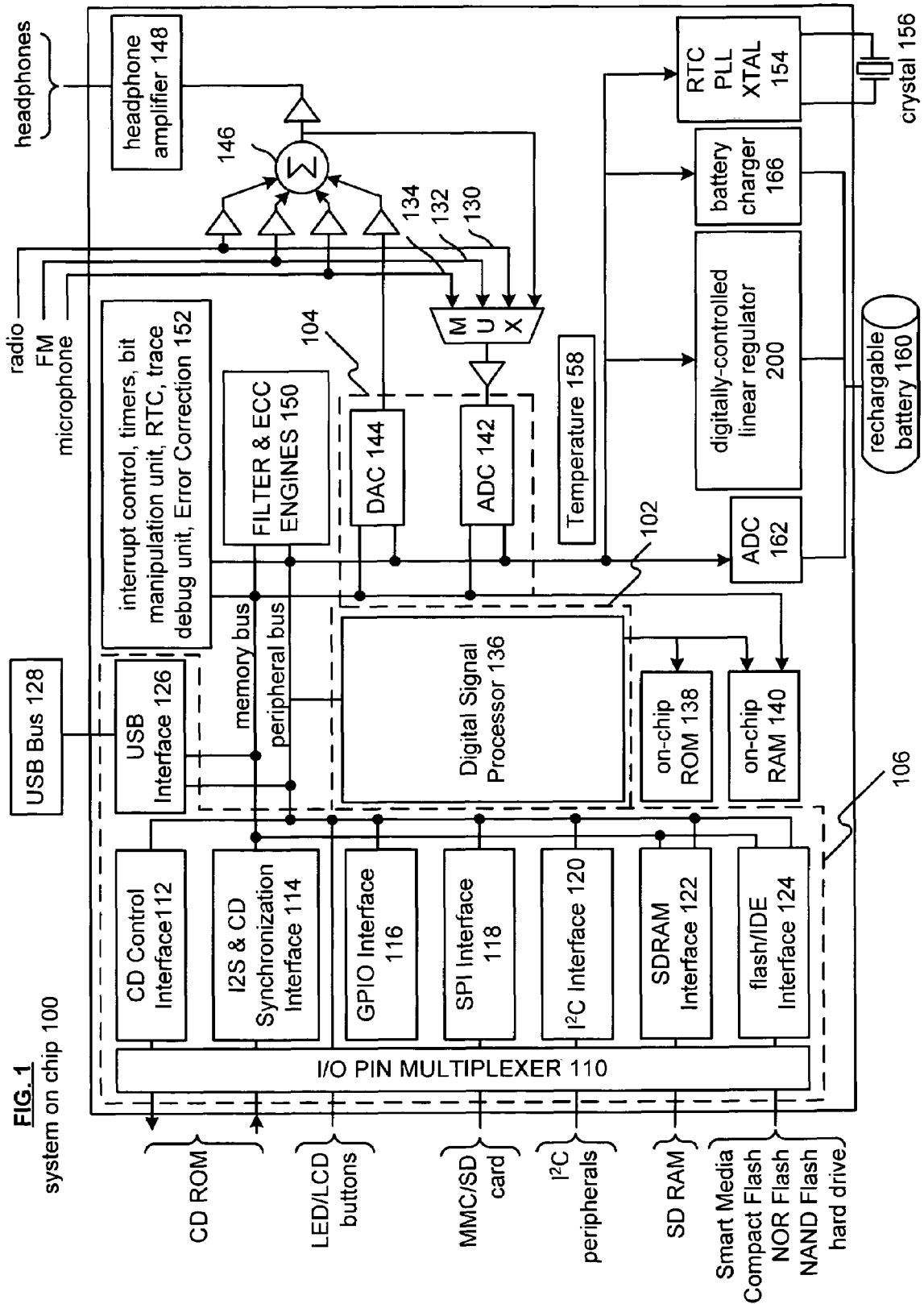
FIG. 1 is a schematic block diagram of a multiple function battery operated system-on-a-chip in accordance with the present invention.

Referring to FIG. 1, an example system on chip integrated circuit (IC) 100 is shown in which one embodiment of the invention is implemented within IC 100. The example IC 100 is a single IC chip that implements a multiple function system-on-a-chip. It is to be noted that the example embodiment of FIG. 1 implements a complete media system on a single chip, but other embodiments of the invention may incorporate one or more integrated circuit chips to provide a complete system or parts of a system.

As illustrated in FIG. 1, a variety of blocks are noted within the IC 100. The various blocks exemplify hardware components, software and interfaces resident within IC 100. The example media system of IC 100 may operate with one or a variety of devices, as illustrated in FIG. 1.

Accordingly, a CD (compact disc); LED (Light Emitting Diode)/LCD (Liquid Crystal Display) displays, buttons and/or switches; MMC (Multimedia Card)/SD (Secure Digital) cards; I²C (Inter-Integrated Circuit) peripherals; SmartMedia, Compact Flash, NOR Flash, NAND Flash, and/or hard drive devices; and memory, such as SDRAM (Synchronous Dynamic Random Access Memory) are some components that may be coupled to IC 100 through the digital interface circuitry 106 is provided by an I/O (input/output) pin multiplexer 110, as illustrated in FIG. 1. These various multiplexed connections are coupled to respective interfaces, as shown in FIG. 1. These interfaces include CD control interface 112; I2S and CD synchronization interface 114; GPIO (General Purpose Input/Output) interface 116; SPI (Serial Peripheral Interface) interface 118; I2C interface 120; SDRAM interface 122; and Flash/IDE (Integrated Device Electronics) interface 124.

Furthermore, the digital interface circuitry 106 provides a Universal Serial Bus ("USB") interface 126 for the coupling of a USB connection external to the IC 100. The USB interface 126 provides compatibility with USB 2.0 specification, which is backwards compatible to a USB 1.1 specification. As should be readily appreciated, the USB interface 126 may be provided for interfacing with additional USB specifications or similar communications protocols as they become available. A microphone input, radio input and a line input are also available on IC 100 via the LINE IN 130, FM IN 132, and MIC IN 134 ports to allow interconnection to a microphone, radio, or other audio input.

The processing core 102 of the IC 100 is a DSP (Digital Signal Processor) 136 may be provided as a 24-bit Digital Signal Processor. An on-chip ROM (Read Only Memory) 138 and an on-chip RAM (Random Access Memory) 140 operate as memory for DSP 136. The processing core 102 may also provided by microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Data stored in the ROM 138 and RAM 140, which may have 64 Mbytes or greater of storage capacity, may be text files, presentation files, user profile information for access to varies computer services (for example, Internet access, email, etc.), digital audio files (for example, MP3 files, WMA—Windows Media Architecture-, MP3 PRO, Ogg Vorbis, AAC—Advanced Audio Coding), digital video files—for example, still images or motion video such as MPEG (motion picture expert group) files, JPEG (joint photographic expert group) files, etc.—address book information, and/or any other type of information that may be stored in a digital format.

The mixed signal circuitry 104 is provided as an analog-to-digital converter ("ADC") 142 and a digital-to-analog converter ("DAC") 144. The ADC 142 allows for analog inputs to be converted to digital format for processing by DSP 136. Similarly, the DAC 144 is present to convert digital signals to analog signals for output in analog form. In this instance, amplified signals through a summing module 146 and headphone amplifier 148 generate an amplified analog signal output external to the IC 100. For example, the analog output may be operably coupled to a set of headphones, or other suitable audio output.

Also included within the IC 100 is a filter and ECC (Error Correction Circuit) engines 150 to provide filtering and error correction operations. Other functions are shown within block 152 to provide various control and timing functions. These may include Interrupt Control, Timers, Bit Manipulation Unit, Real Time Clock (RTC), Trace Debug Unit, and error correction just to name a few of the operations.

Also within the IC 100 is a RTC PLL (Real Time Clock/Phase Lock Loop) circuit 154, which is operably coupled to an external crystal 156 to provide an accurate clocking signal for circuits of the IC 100. Memory and peripheral buses are also present within the IC 100 for transfer of data and signals. A temperature sensor circuit 158 is present to monitor the temperature of IC 100.

In FIG. 1, a rechargeable battery 160 is shown coupled to a lower resolution ADC 162, a digitally-controlled linear regulator 200, and a battery charger 166. The ADC 162 monitors the battery voltage to determine if the battery voltage is such that battery 160 may require charging or if the battery is fully charged. The ADC 162 may also monitor the battery voltage to determine if a battery is present. Thus, if the battery is not present or is removed during use, the IC 100 detects the absence of the battery through the monitoring provided by the ADC 162.

The digitally-controlled linear regulator 200 operates to convert the source voltage, such as a battery source or non-battery source, to an operative voltage utilized by the components of the IC 100. Also, the digitally-controlled linear regulator 200 operates to provide a regulated—that is, a substantially constant and steady—operative voltage utilized by components of the IC 100. The battery charger 166 is utilized to charge the battery when an external voltage source is coupled to the IC 100.

A variety of batteries may be utilized for battery 160 and, as noted above, battery 160 is a rechargeable battery. In one particular embodiment, the rechargeable battery is a Nickel Metal Hydride (NiMH) battery. Various other batteries may be utilized, including alkaline cells and lithium ion (LiON) batteries. Generally, battery 160 provides a voltage in the range of about 0.9 to about 3.6 volts to IC 100. In the instance where a NiMH battery is used, the typical range is 0.9 to 1.25 volts. Since the voltage from the battery may vary, and/or the circuitry may require voltages other than what is provided by the battery, the digitally-controlled linear regulator 200 may provide conversion of the battery voltage to one or more voltages utilized on the IC 100. In some embodiments, the digitally-controlled linear regulator 200 may provide more than one DC conversion from the battery. For example, in one embodiment a NiMH battery of 0.9 to 1.25 volts may provide nominal chip voltage of 3.3 volts to the IC 100. In another a combination of 3.3 volts and 1.8 volts are provided to the IC 100.

The IC 100 is designed to also operate from other external power sources, when such power sources are coupled to IC 100. The digitally-controlled linear regulator 200 operates to regulate such external power sources to provide power to the components of the multiple-function system-on-a-chip of the IC 100.

One of the external power sources may be provided through USB interface 126. Under the USB 2.0 protocol specification, for example, data transfer is specified by the use of differential data lines through a USB link, such as a USB bus 128. The data is generally provided on a differential line ("D+" and "D–" lines). The USB 2.0 protocol specification also specifies the presence of a +5 volt DC voltage through the USB interface 126 through $V_{BUS}$ and ground (GND) connections. Thus, an external power source having a voltage of +5 volts (nominal) may be used as a power source for the IC 100 through the USB interface 126 when the USB bus 128 is coupled to the IC 100. In this instance, a USB host provides the +5 volts, while IC 100 operates as a USB device coupled to the USB host. The IC 100 then may use the 5 volts to power components or circuitry on the IC 100 provided that the various USB specification requirements are met. Referring to FIG. 1, when USB bus 128 is coupled to the IC 100, the 5 volts from the USB host powers the internal circuitry, instead of battery 160. The battery charger 166 uses the 5 volts from the USB host to also charge battery 160.

Other interface protocols may be implemented, such as Ethernet protocols (such as "Power over Ethernet" under IEEE 802.3af), Firewire under IEEE 1394, etc. Increasingly, interface specifications are being generated for direct connection of handheld devices such as Personal Digital Assistants (PDAs), cellular phones, MP3 players, and digital cameras to one another without the need for a host PC, in which may provide interface capabilities to the multiple-function system-on-a-chip of the IC 100.

Figure 2:
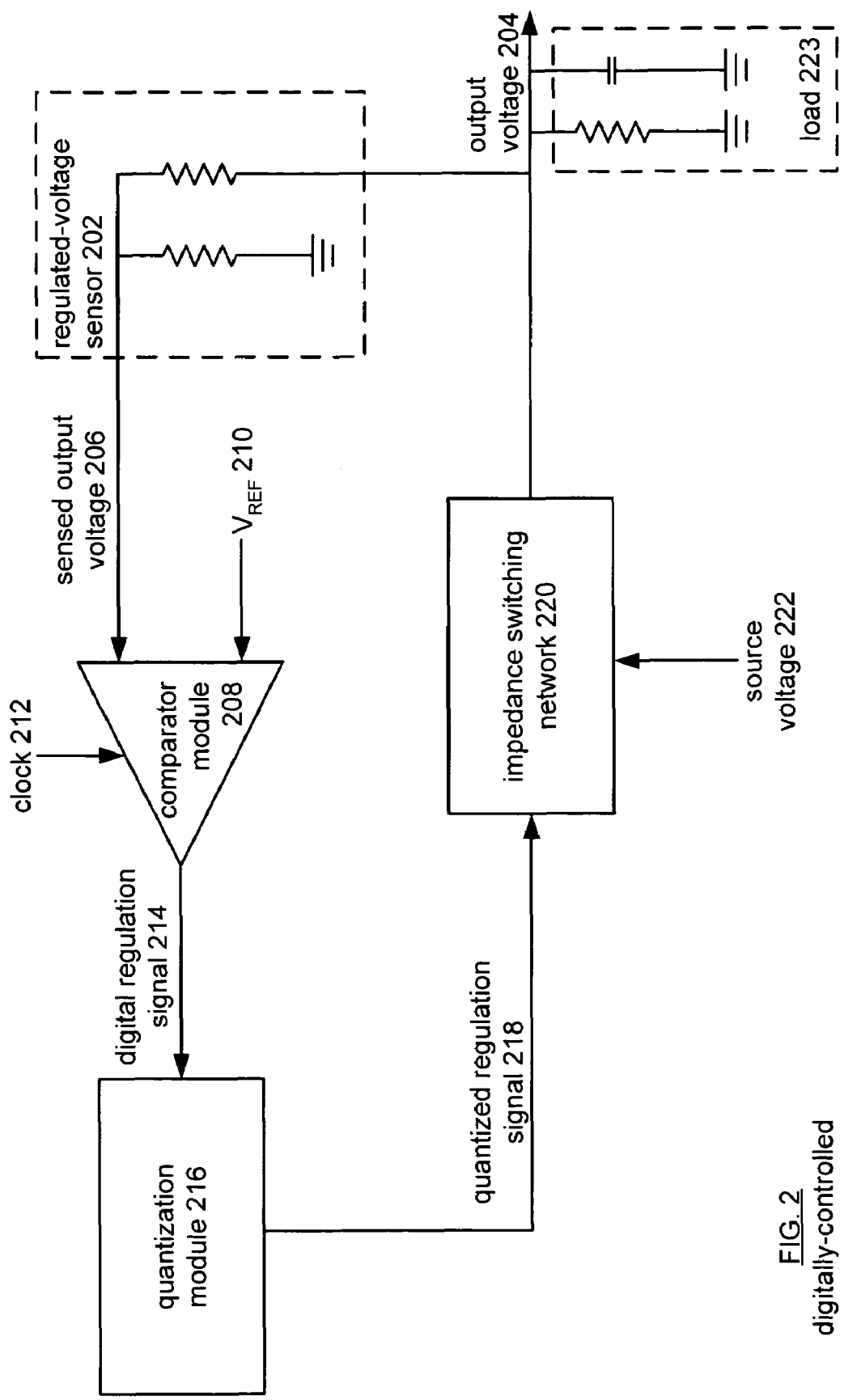
FIG. 2 illustrates a schematic block diagram of a digitally-controlled linear regulator with noise-shaped component selection in accordance with the present invention.

FIG. 2 illustrates a schematic block diagram of the digitally-controlled linear regulator having noise-shaped component selection 200. The digitally-controlled linear regulator 200 includes a regulated-voltage sensor 202, a comparator module 208, a quantization module 216, an impedance switching network 220, and a load 223. Generally, regulation is provided through noise-shaped component selection by providing a feedback path from the output voltage 204 via the regulated-voltage sensor 202, the comparator module 208, and the quantization module 216, which provides a noise-shaped component selection signal through a quantized regulation signal 218 to manipulate the impedance value of the impedance switching network 220. The impedance switching network 220 is operably connected between the voltage source 222 and the output voltage 204.

The load 223 is also a device that is capable of storing and dissipating energy. In the illustrated example, the load 223 is a resistor, which may be coupled in parallel to a capacitor.

The voltage source 222 may be a battery such as the rechargeable battery 160 shown in FIG. 1, but as one of average skill in the art would readily appreciate, the source 222 may be a DC output from a USB interface, a switch mode power supply or any power supply device that produces a suitable power source. The load 223 provides the output voltage 204, which may be a DC output.

The regulated-voltage sensor 202 has resistors arranged in a divider network such that a representation of the output voltage 204 is provided to the comparator module 208 as a sensed output voltage 206. The comparator module 208 also receives a voltage reference $V_{REF}$ 210. At a given clock rate, which is produced by the clock 212, the comparator module 208 generates a digital regulation signal 214. Note that the clock rate and the number of cycles processed by the quantization module 216, for a given set of cycles, from the comparator module 208 is selected to optimize performance and/or circuit complexity.

The quantization module 216 is operably coupled to receive the digital regulation signal 214 and to produce therefrom a quantized regulation signal 218. The quantized regulation signal 218 provides data regarding the impedance level for the impedance switching network 220. In general, the quantization module 216 operates to divide a continuous range of input signal values provided by the regulation signal 214 into nonoverlapping subranges provided through the quantized regulation signal 218. With the quantized regulation signal 218 coming within a subrange, a corresponding discrete value is provided.

The impedance switching network 220 is operably coupled to receive the quantized regulation signal 218. The impedance switching network 220 as shown is operably coupled between a source voltage 222 and the output voltage 204 wherein the level of impedance provided by the impedance switching network 220 translates a level of voltage and current to be placed at the output voltage 204.

In operation, the digitally-controlled linear regulator 200 senses the output voltage 204 and provides noise-shaped component selection through a control or feedback path responsive to voltage and/or current requirements of the load 223. As the power requirement of the load 223 changes, the regulated-voltage sensor 202 senses the output voltage 204, providing a sensed output voltage 206. The sensed output voltage 206 is compared with the voltage reference $V_{REF}$ 210 at a predetermined clock rate provided by clock 212 to produce the digital regulation signal 214. The digital regulation signal 214 is indicative of at least the current requirements for the load 223.

The quantization module 216 quantizes the digital regulation signal to produce the quantized regulation signal 218. The feedback path provided from the output voltage 204 through the quantized regulation signal 218 output provides noise-shaped component selection via the impedance switching network 220.

As shown in FIG. 2, the digital regulation signal 214 has an n-bit format, and the quantized regulation signal 218 has an m-bit format. Generally, the bits associated with the digital regulation signal 214 is greater than the bits of the quantized regulation signal 218 in that n-bits is greater than m-bits. The n-bits of the digital regulation signal 214 represent the impedance value for the impedance switching network 220 to be operably coupled between the source voltage 222 and the output voltage 204. The number of the n-bits for the digital regulation signal 214 exceed the finite number of resistive elements or impedance values available through the impedance switching network 220, as is discussed further with respect to FIGS. 5 through 7. Accordingly, the quantization module 216 operates to quantize the digital regulation signal 214, which is indicative of the regulator operating level, to a discrete value associated with the finite number of resistive elements or impedance values available through the impedance switching network 220.

As can be appreciated, the digitally-controlled linear regulator 200 provides a wide-bandwidth variation capability through the clock rates provided via the clock 212, and via the clocks associated with the quantization module 216. Also, further wide-bandwidth variation capability is provided by varying the values used in the loop filter 226. That is, increasing the clock rates correspondingly increases the bandwidth of the digitally-controlled linear regulator 200. Further, adjustment of the clock rates allows placing the digitally-controlled linear regulator 200 in a standby mode, such as a USB standby mode, where minimal power is used by the regulator 200. For comparison, analog linear regulators require a relatively high minimal power, otherwise stability cannot be sustained for such circuits.

Figure 3:
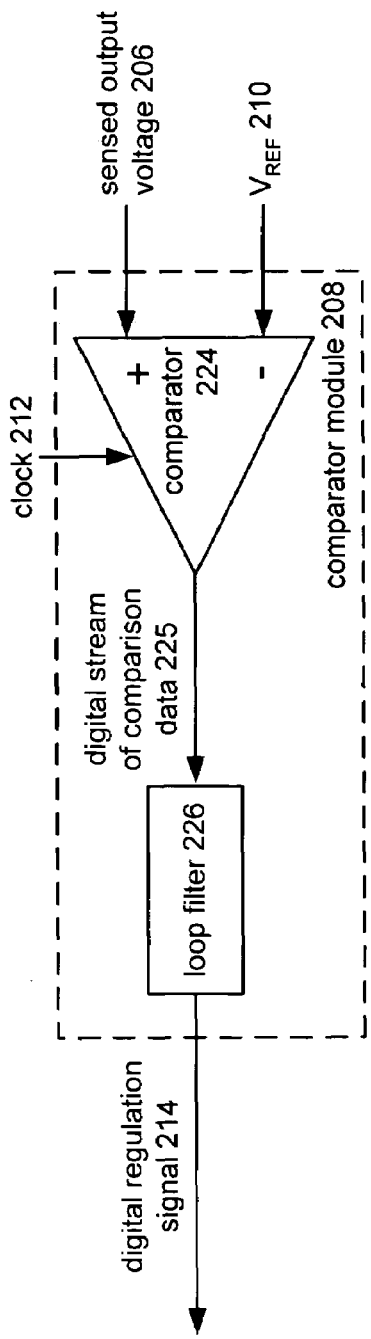
FIG. 3 illustrates a schematic block diagram of the comparator module of FIG. 2 in greater detail.

FIG. 3 illustrates a schematic block diagram of the comparator module 208 in greater detail. The comparator module 208 has a comparator 224 and a loop filter 226.

As shown, the sensed output voltage 206 and the voltage reference $V_{REF}$ 210 are operably coupled to the comparator 224. Accordingly, the comparator 224 compares the sensed output voltage 206 with the reference voltage $V_{REF}$ 210 to produce a digital stream of comparison data 225. The comparator 224 is operatively coupled to the loop filter 226. The digital stream of comparison data 225, accordingly, is provided to the loop filter 226. The loop filter 226 is generally of a configuration to provide higher frequency noise filtering, and maintain feedback path stability, wherein the filtered result is output as the digital regulation signal 214. As is known to those skilled in the art, the loop filter 226 may be provided as an integrator circuit having an output operably coupled to a linearizer-function circuit, as well as other configurations such as a resistor-capacitor series configuration.

Figure 4:
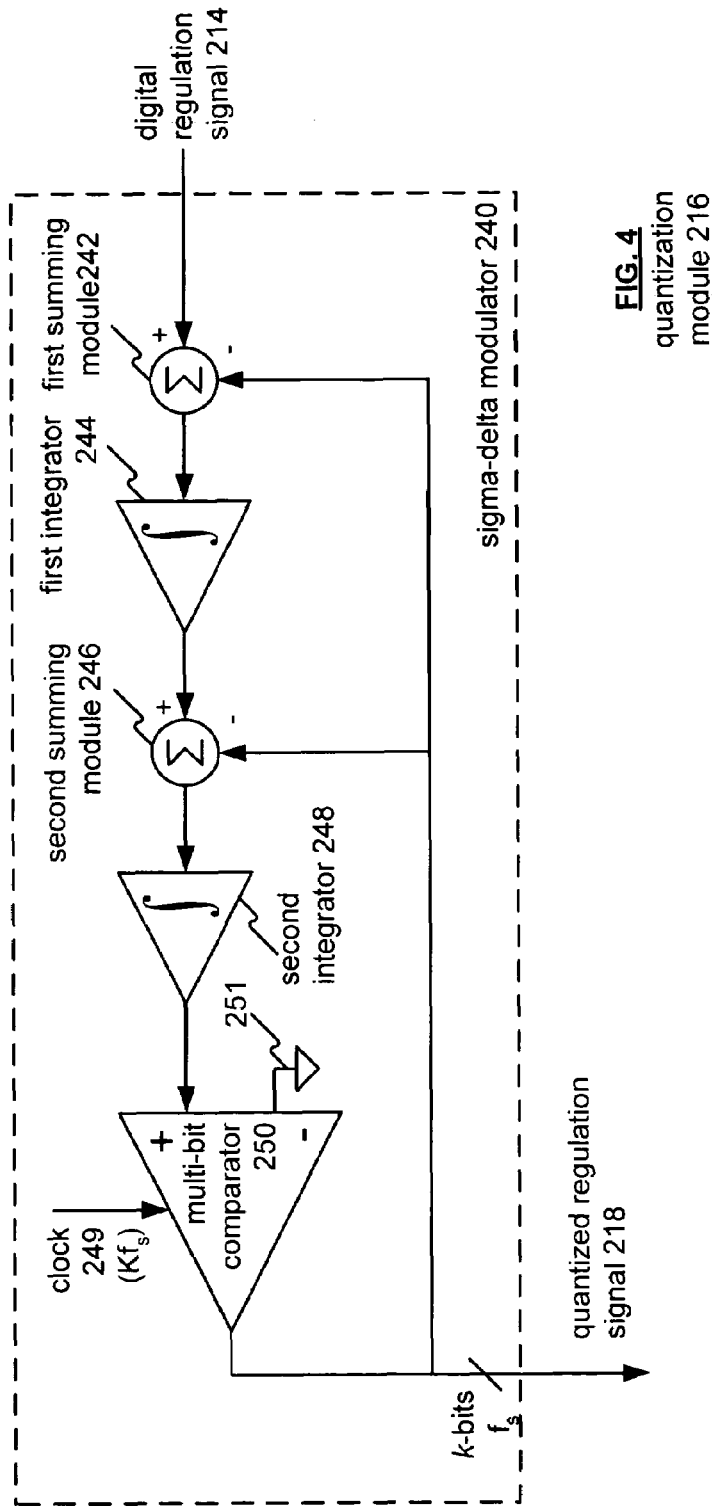
FIG. 4 illustrates a schematic block diagram of the quantization module of FIG. 2 in greater detail.

FIG. 4 illustrates a schematic block diagram of the quantization module 216 in greater detail. As shown, the quantization module 216 is implemented as a second-order sigma-delta modulator having a first summing module 242, a first integrator 244, a second summing module 246, a second integrator 248, and a multi-bit comparator 250.

The digital regulation signal 214 is operably coupled to a first input of the summing module 242. An output of the summing module 242 is operably coupled to the first integrator 244 which, in turn, is operably coupled to the input of the second summing module 246. The second integrator 248 is operably coupled via its output to the multi-bit comparator 250. The multi-bit comparator 250 is operably coupled to sense the output of the second integrator 248 to compare it with a reference voltage 251, which is shown in FIG. 4 as a digital ground. The multi-bit comparator 250 compares the output of the second integrator 248 with the reference voltage to produce k-bits at a predetermined clock rate of $Kf_s$ provided by the clock 249, where "K" is a constant value selected to provide a clock rate that substantially corresponds to the data rate associated with the digital regulation signal 214. The output of the multi-bit comparator 250 is operably coupled to the subsequent inputs of the first summing module 242 and a second input of the second summing module 246, accordingly.

As discussed, the quantization module 216, through use of the second order sigma-delta modulator, is operatively coupled to quantize the digital regulation signal 214 to produce the quantized regulation signal 218.

In operation, the data provided by the digital regulation signal 214 is summed at the first summing module 242 with the multi-bit output of the comparator 250. The output of the first summing module 242 is provided to the first integrator 244, which adds the output of the first summing module 242 to a value that the first integrator has stored from a previous integration step. The output of the first integrator 244 is provided to the second summing module 246 with the multi-bit output of the multi-bit comparator 250. The output of the second summing module 246 is provided to the second integrator 248, which adds the output of the second summing module to a value that the second integrator 248 has stored from a previous integration step. The output of the second integrator 248 is provided to the multi-bit comparator 250, wherein the comparator 250 compares the output of the second integrator 248 with the reference value 251 at a predetermined clock rate $Kf_s$ provided by the clock 249, where K is a coefficient selected to provide a clock rate that substantially corresponds to the data rate associated with the digital regulation signal 214. It should be readily appreciated, however, that other values of K may be selected so as to provide other sampling rates, such as oversampling, with respect the data rate of the digital regulation signal 214.

The output of the multi-bit comparator 250 is fed into the summing modules 242 and 246. The quantization module 216 can be provided by other circuitry, such as truncation or rounding circuitry. But by using a sigma-delta modulator 240, noise from the quantization can be pushed to the higher frequencies so that it can be filtered out by the capacitance of the load 223.

FIG. 5 illustrates a schematic block diagram of the impedance switching network 220 provided by a switching network with fixed impedance circuit 280. As shown, the circuit 280 has switches $Q_1$ (that is, $2^0$) through $Q(2^{m-1})$ and fixed impedance components $R_1$ (that is $2^0$) through $R(2^{m-1})$. The respective gates of the switches $Q_1$ through $Q(2^{m-1})$ are operably coupled to the quantized regulation signal 218. The m-bit count of the quantized regulation signal 218 corresponds to the number of resistive circuits of the impedance switching network 220. The switches $Q_1$ through $Q(2^{m-1})$ have respective first nodes operably coupled to the output voltage 204 and respective second nodes operably coupled to the source voltage 222 through the respective resistive elements $R_1$ through $R(2^{m-1})$. As shown, the number of transistor and resistor legs correspond with the m-bits of the quantized regulation signal 218 to provide a series of transistor and resistive combinations that are coupled to the source voltage 222. When the switches $Q_1$ through $Q(2^{m-1})$ are correspondingly activated or deactivated, the impedance value of the circuit is varied based on the quantized regulation signal 218. As should be readily appreciated, the fixed impedance may also be provided by other components.

FIG. 6 illustrates a schematic block diagram of the impedance switching network 220 provided by a switched-capacitor network 290 in a boost configuration. The switched-capacitor network has switches Q1, Q2, Q3, and Q4, and a fixed impedance provided by capacitor C. The switch Q1 is operably coupled between the source voltage 222 and a first node of the capacitor C. A second node of the capacitor C is operably coupled to ground through switch Q2. The switch Q3 is operably coupled between the source voltage 222 and the second node of the capacitor C. The switch Q4 is operably coupled between the first node of the capacitor C and the output voltage 204. The inputs to the switches Q1, Q2, Q3, and Q4 are operably coupled to receive the quantized regulation signal 218. The quantized regulation signal 218 operates to place the switches Q1, Q2, Q3, and Q4 in a first state $\phi_1$ or a second state $\phi_2$, accordingly.

As shown, the quantized regulation signal 218 has m-bits that are provided to the inputs of respective switches. When the quantized regulation signal 218 provides a first state $\phi_1$, the switch Q1 and the switch Q2 operate to place the capacitor C such that it is coupled across the source voltage 222 and thus is receiving a voltage. When the quantized regulation signal provides a second state $\phi_2$, switch Q3 and Q4 operate to couple the capacitor C to the output voltage 204, and accordingly, the load 223 (see FIG. 2). In this manner, the impedance value of the circuit is varied based upon the quantized regulation signal 218.

Figure 7:
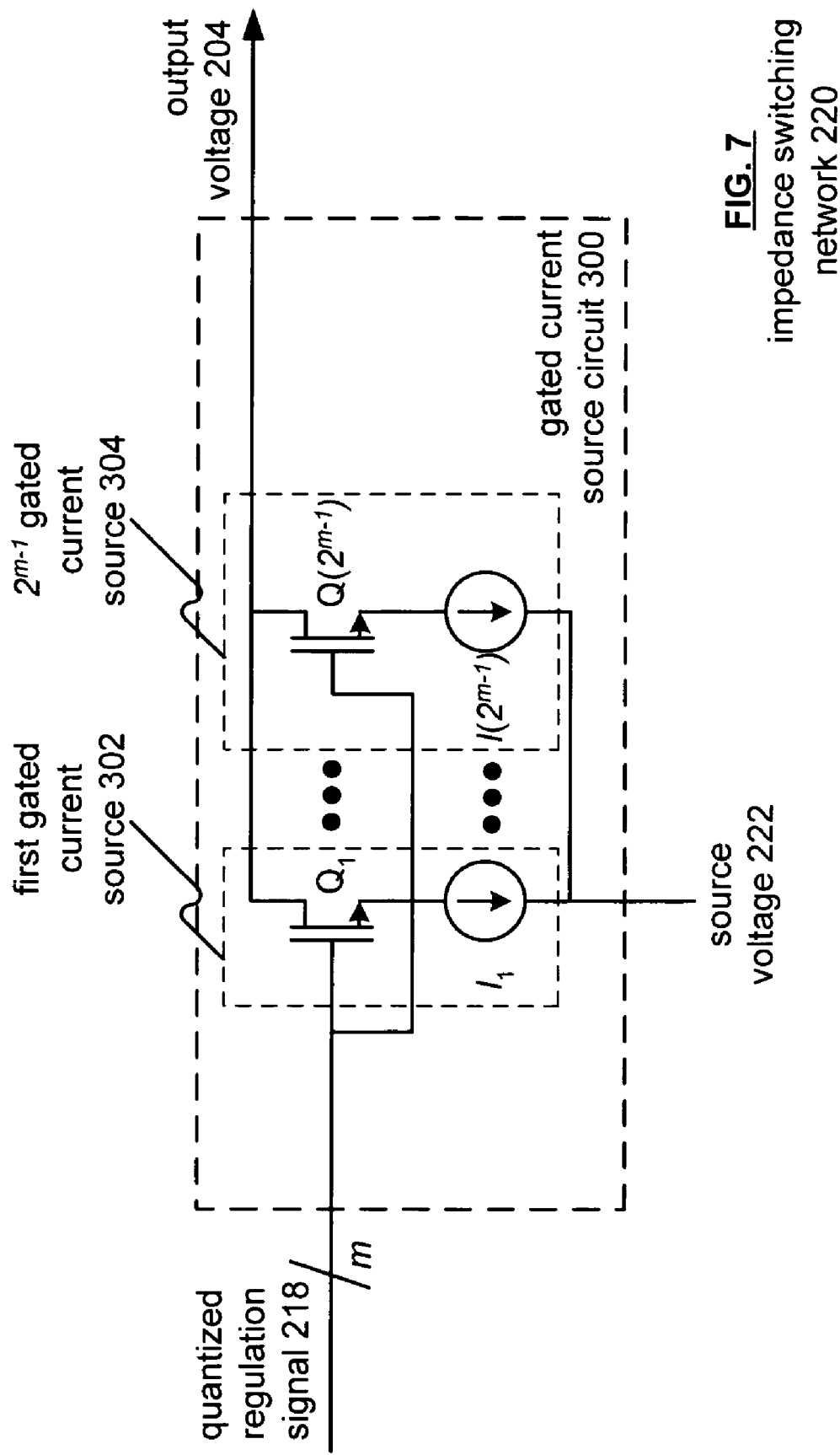
FIG. 7 a schematic block diagram of the impedance switching network of FIG. 2 implementing a gated current source circuit.

FIG. 7 a schematic block diagram of the impedance switching network 220 provided by a gated current source circuit 300. The gated current source circuit 300 includes a plurality of gated current sources having a first gated current source 302 through $2^{m-1}$ gated current sources 304. Each of the gated current sources has a switch Q, and a current source I Accordingly, the first gated current source 302 has a switch $Q_1$ (that is, $2^0$) and a current source $I_1$ (that is, $2^0$), and the $2^{m-1}$ gated current source 304 has a switch $Q(2^{m-1})$ and a current source $I(2^{m-1})$. The variable m corresponds to the bit-count of the quantized regulation signal 218. The plurality of switches Q1 through $Q(2^{m-1})$ are selectively activated and deactivated based on the quantized regulation signal 218. Accordingly, the impedance of the impedance switching network 220 is varied based on the quantized regulation signal 218. As should be readily appreciated by those skilled in the art, each of the switches $Q_1$ through $Q(2^{m-1})$, when activated, allow a current I to flow across the respective drain and source nodes of the transistor, incurring a resistive value due to the transconductance characteristics of the respective switch. In this manner, as switches in the circuit are turned to an "on" state, based on the quantized regulation signal 218. The cumulative total of the activated and/or deactivated transistors between the source voltage 222 and the output voltage 204 provides a regulation function to the voltage source 222 to produce the output voltage 204.

Figures 8, 9:
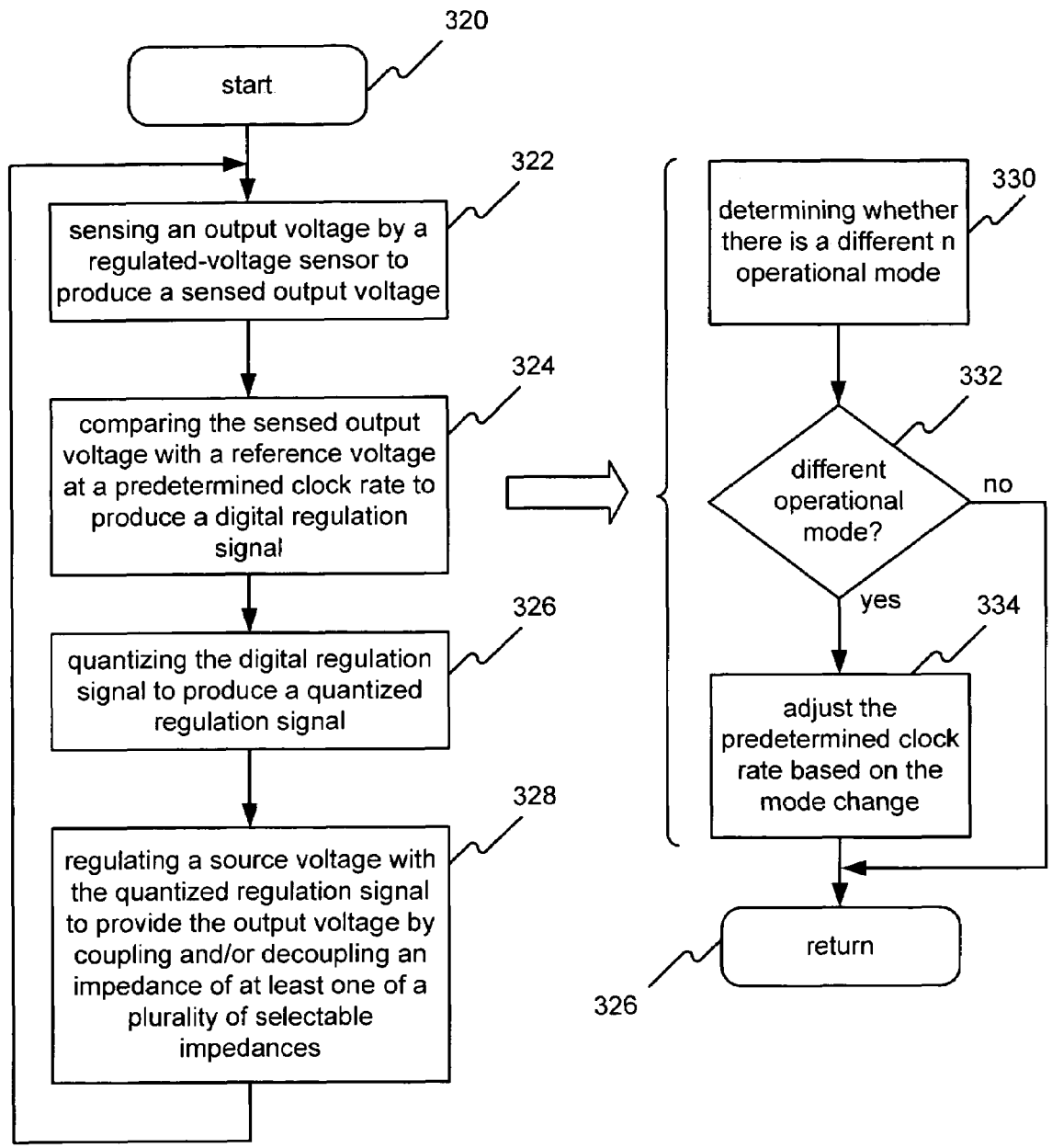
FIG. 8 illustrates a logic diagram of a method for digitally regulating a power source using noise-shaped component selection in accordance with the present invention.
FIG. 9 illustrates a logic diagram of a method for adjusting the predetermined clock rate to digitally-regulating a power source using noise-shaped components of the present invention.

FIG. 8 illustrates a logic diagram of a method for digitally regulating a power source. The method begins at step 322 where an output voltage of a digitally-controlled regulation circuit is sensed by a regulated-voltage sensor to produce a sensed output voltage.

At step 324, the sensed output voltage is compared with a reference voltage at a predetermined clock rate to produce a digital regulation signal. Note that the comparison may be done at a first clock rate where subsequent steps will be done at a second clock rate that is different from the first clock rate. As an example, a suitable second clock rate may be less than the first clock rate, such that the quantization module 216 may operate at a lower clock rate than the comparator module 208.

At step 326, the digital regulation signal is quantized to produce a quantized regulation signal. The digital regulation signal is indicative of the regulator operating level. Quantizing the digital regulation signal operates to associate the values of the digital regulation signal 214 (see FIG. 2) to a discrete value that correlates with the finite number of resistive elements or impedance values available through an impedance switching network via the quantized regulation signal 218.

At step 328, the source voltage is regulated with the quantized regulation signal to provide the output voltage. Generally, regulation may be provided by manipulating the impedance value of the impedance switching network 220 (see FIG. 2), which is operably connected between the voltage source and the output voltage.

FIG. 9 illustrates a logic diagram of another method for regulating a power source where the predetermined clock rate is adjusted with respect to an operational mode. The method begins at step 330 where a determination is made of whether there is a different operational mode requested or desired with respect to the regulation method. An example of a differing operational modes is with respect to the clock rate for a system such as the IC 100 shown in FIG. 1. For example, in a power conservation mode (such as in stand-by or sleep operation), a lower clock rate is provided.

At step 332, if a different operational mode is present, then at step 334 the predetermined clock rate is adjusted based on the mode change. The predetermined clock rate adjustment may be, but is not limited to, constant gains applied to increase or decrease the clock rate accordingly. Returning to the main path of the logic diagram at step 326, the process proceeds to step 326.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal. While the transistors or switches in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The preceding discussion has presented a method and apparatus digitally regulating an output voltage through an impedance switching network.

What is claimed is:

1. A digitally-controlled linear regulator using noise-shaped component selection comprises:
    a regulated-voltage sensor operably coupled to sense an output voltage of the digitally-controlled linear regulator to produce a sensed output voltage;
    a comparator module operably coupled to compare the sensed output voltage with a reference voltage at a predetermined clock rate to produce a digital regulation signal;
    a quantization module operably coupled to quantize the digital regulation signal to produce a quantized regulation signal; and
    an impedance switching network operably coupled to convert a source voltage into the output voltage of the digitally-controlled linear regulator based on the quantized regulation signal.

2. The digitally-controlled linear regulator of claim 1 wherein the comparator module comprises:
   a comparator operably coupled to compare the sensed output voltage with the reference voltage at the predetermined clock rate to produce a digital stream of comparison data; and
   a loop filter operably coupled to the digital stream of comparison data to produce the digital regulation signal.

3. The digitally-controlled linear regulator of claim 2 wherein the quantization module is a sigma-delta modulator.

4. The digitally-controlled linear regulator of claim 1 wherein the impedance switching network comprises:
   a selective resistive network to vary the impedance of the network based on the quantized regulation signal.

5. The digitally-controlled linear regulator of claim 1 wherein the impedance
   switching network:
   a fixed impedance; and
   a switch that operably couples and decouples the fixed impedance between the source voltage and the output voltage based on the quantized regulation signal.

6. The digitally-controlled linear regulator of claim 1 wherein the impedance switching network comprises:
   a plurality of gated current sources that are selectively activated and deactivated based on the quantized regulation signal.

7. The digitally-controlled linear regulator of claim 1 wherein the impedance switching network is a switched-capacitor network.

8. The digitally-controlled linear regulator of claim 1 is an integrated circuit.

9. A comprehensive system-on-a-chip comprises:
   a processing core operably coupled to process input digital data and produce therefrom output digital data;
   digital interface circuitry operable coupled to provide the input digital data to the processing core and to receive the output digital data from the processing core;
   mixed signal circuitry operably coupled to convert input analog signals into the input digital data and to convert the output digital data into output analog signals; and
   digital linear regulator circuitry operably coupled to convert a source voltage into a supply voltage that supplies at least one of: the processing core, the digital interface circuitry, and the mixed signal circuitry, wherein the digital linear regulator circuitry includes:
   a regulated-voltage sensor operably coupled to sense an output voltage of the digitally-controlled linear regulator to produce a sensed output voltage;
   a comparator module operably coupled to compare the sensed output voltage with a reference voltage at a predetermined clock rate to produce a digital regulation signal;
   a quantization module operably coupled to quantize the digital regulation signal to produce a quantized regulation signal; and
   an impedance switching network operably coupled to convert a source voltage into the output voltage of the digitally-controlled linear regulator based on the quantized regulation signal.

10. The comprehensive system-on-a-chip of claim 9 wherein the processing core is a digital signal processor.

11. The comprehensive system-on-a-chip of claim 9 wherein the comparator module further comprises:
    a comparator operably coupled to compare the sensed output voltage with the reference voltage at the predetermined clock rate to produce a digital stream of comparison data; and
    a loop filter operably coupled to the digital stream of comparison data to produce the digital regulation signal.

12. The comprehensive system-on-a-chip of claim 9 wherein the impedance switching network further comprises:
    a selective resistive network between the source voltage and the output voltage to vary the impedance of the network based on the quantized regulation signal.

13. The comprehensive system-on-a-chip of claim 9 wherein the impedance switching network further comprises:
    a plurality of gated current sources that are selectively activated and deactivated based on the quantized regulation signal.

14. The comprehensive system-on-a-chip of claim 9 wherein the impedance switching network further comprises:
    a fixed impedance; and
    a switch that operably couples and decouples the fixed impedance between the source voltage and the output voltage.

15. A method of digitally regulating a power source comprises:
    sensing an output voltage by a regulated-voltage sensor to produce a sensed output voltage;
    comparing the sensed output voltage with a reference voltage at a predetermined clock rate to produce a digital regulation signal;
    quantizing the digital regulation signal to produce a quantized regulation signal; and
    regulating a source voltage with the quantized regulation signal to provide the output voltage by operably coupling and decoupling an impedance of at least one of a plurality of selectable impedances between the source voltage and the output voltage in accordance with the quantized regulation signal.

16. The method of digitally regulating a power source of claim 15 wherein quantizing the digital regulation signal to produce a quantized regulation signal is performed by a sigma-delta modulator.

17. The method of digitally regulating a power source of claim 15 wherein regulating a source voltage further comprises:
    enabling charging of an impedance element by the source voltage in accordance with the quantized regulation signal; and
    enabling discharging of the impedance element to a load in accordance with the quantized regulation signal.

18. The method of digitally regulating a power source of claim 15 wherein regulating a source voltage further comprises:
    operably coupling and decoupling a gated current source of a plurality of gated current sources between the source voltage and the output voltage in accordance with the quantized regulation signal.

* * * * *